June 24, 1958  C. B. STEVENS  2,840,287
CROSSBAR TANK FOR CYCLES
Filed Aug. 30, 1955

INVENTOR
CLIFFORD BROOKS STEVENS
BY
*Tennes & Ersted*
ATTORNEY

United States Patent Office 2,840,287
Patented June 24, 1958

2,840,287

CROSSBAR TANK FOR CYCLES

Clifford Brooks Stevens, Milwaukee, Wis., assignor, by mesne assignments, to American Machine & Foundry Company, New York, N. Y., a corporation of New Jersey Application August 30, 1955, Serial No. 531,431

5 Claims. (Cl. 224—35)

This invention relates to cycle accessories and particularly to crossbar tanks for attachment to the crossbar of a bicycle or tricycle and to a method for making compartment tanks for cycles.

The crossbar or compartment tanks heretofore employed on bicycles have been relatively expensive which added materially to the cost of the bicycles since they required special dies and special forming of the bicycle frame.

It is a purpose of this invention to provide a streamlined crossbar tank which is suitable for use with a sidewalk bicycle which will be of such simple design that it will not add materially to the cost of the bicycle.

It is also an object of this invention to provide a tank which will be of a simple design and low in cost of manufacture.

A further object of this invention is to provide a crossbar tank for a bicycle or tricycle which will be of a single sheet of metal and which will be readily adaptable for being pivotally attached to the existing crossbar of a bicycle.

A further object of this invention is to provide a crossbar tank for a bicycle which will have incorporated into its design a stop which will hold the crossbar tank in an open position to allow the contents to be readily removed.

A further object of this invention is to provide a crossbar tank wherein the crossbars of the bicycle acts as a cover for the tank.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 1:
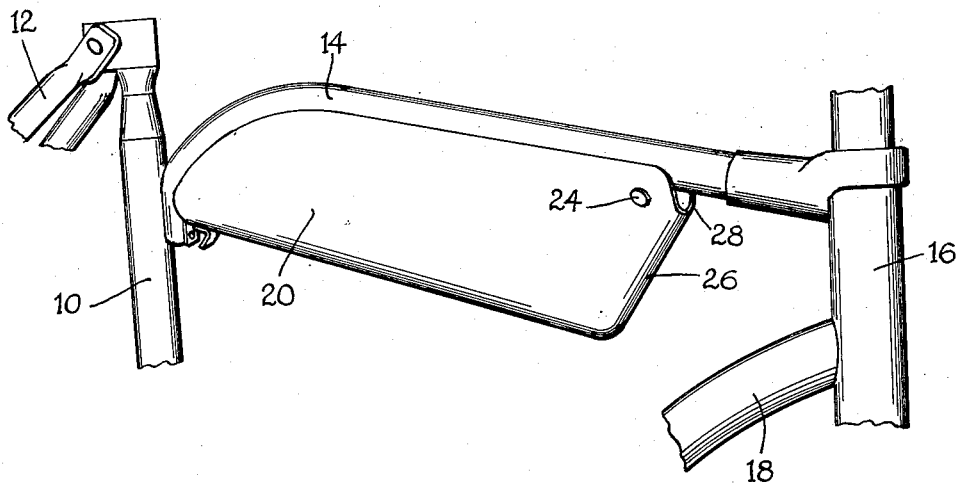
Fig. 1 is a perspective view of the tank in a closed position.

In the drawings, I have shown how my compartment tank is applied to the upper cross bar 14 of a conventional bicycle. One end of the cross bar is connected to a saddle post 10 which has an upper rear fork 12 extending therefrom. The other end of the cross bar 14 is connected to the head post 16. The lower end of the head post 16 has connected with a diagonal cross bar 18 which may be connected at the opposite end to a conventional crank hanger (not shown) which supports the pedals of the bicycles.

The compartment tank 20, which may be used for storing tools or other miscellaneous items, is supported at one end in a downwardly extending bracket 22 which is secured by suitable means such as welding or by a screw to the upper cross bar 14. Holes are mounted in the sides of the compartment tank 20 through which suitable screws 24 pass. The screws 24 also pass through suitable holes formed in the bracket 22 so that the tank is pivotally supported on the screws 24 in the holes formed in the bracket 22.

The compartment tank 20 is made of sheet metal which is prestamped so that when the sides thereof are folded upwardly they will be spaced apart a distance slightly less than the diameter of the upper cross bar. A spacing bracket 27 is provided for supporting the sides at the tank 20 at the correct distance from each other. The forward end 26 of the tank has the ends of the sheet metal curved into a rounded abutment so that it forms a smooth round surface.

Figure 2:
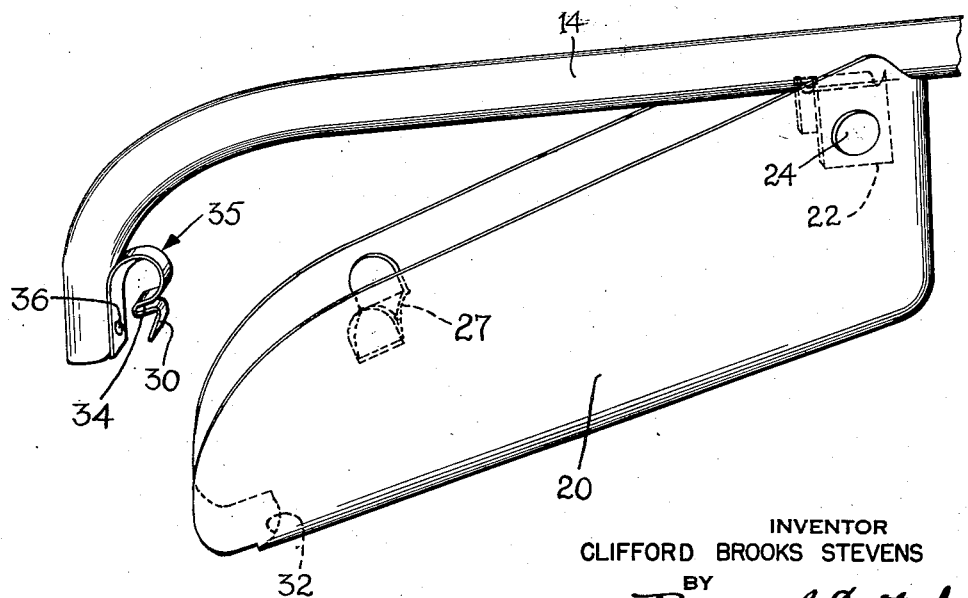
Fig. 2 is a slightly enlarged perspective view showing the compartment tank in open position.

The upper forward end of the compartment tank has a cutout portion 28 formed therein which permits the tank to be opened and limits the extent to which the tank swings downwardly as shown in Fig. 2. This cutout stop portion allows free pivoted movement up to the point where it comes into contact with the cross bar 14. After this the tank is held in the position shown in Fig. 2 which avoids having the tools cascade downward and instead they slide down the surface into easy reaching distance.

As previously indicated, the sides of the tank 20 are spaced from each other a distance slightly less than the diameter of the upper cross bar, so that when the tank is brought into closed position as shown in Fig. 1, the sides of the tank 20 will closely hug the sides of the cross bar 14. It will further be noted that the upper surface of the tank 20 is shaped to correspond to the configuration of the cross bar, so that when the tank is in its uppermost position the cross bar acts as a cover for the tank.

When the tank is moved upwardly to close it, a springed clip 35 having a cam surface 30 is brought into contact with a cutout 32 formed in the tank 20. The cutout 32 forces the spring 35 by means of cam 30 outwardly until the edge of the cutout 32 allows the spring 35 to slide onto the cutout portion 32 thereby seating the cutout portion 32 in the slot 34 formed in the spring 35. This particular arrangement limits the extent to which the tank can be forced upwardly, thereby preventing the sides of the tank from being formed outwardly by their engagement with the sides of the upper cross bar 14. The spring 35 is secured to the cross bar 14 by any suitable means, such as a screw 36 or by welding.

It will be apparent from the above that I have provided a tank which is simple to manufacture. By means of the particular configuration of the tank and the manner in which it is combined with the cross bar to act as a cover for the tank, a minimum of components are required. Due to the spring arrangement, a stop which limits the extent to which it can be moved upwardly and a lock is simultaneously provided for with one spring element. This design enables simple and sturdy compartment tanks to be produced at low manufacturing cost.

The invention herein above described may be varied in construction within the scope of the claims, for the particular device selected to illustrate the invention is but one of many possible embodiments of the same. The invention, therefore, is not to be restricted to the precise details of the structure shown and described.

What is claimed is:

1. A crossbar tank for a cycle comprising an elongated tank having the upper elongated portion thereof open and the bottom elongated portion thereof closed, means for pivoting one end of said tank to the underside of a crossbar of a cycle, a latch for releasably securing the other end of said tank against downward movement relative to said crossbar when the upper elongated open portion of said compartment tank has been moved into abutment with the crossbar to form a cover therefor.

2. A crossbar tank made of sheet metal and having the sides thereof folded so that they are spaced from each other a distance approximately equal to the diameter of the crossbar, means for pivotally connecting one end of said folded sheets of metal to the crossbar, a stop for limiting the distance said folded sheets of metal can pivot away from said crossbar on said pivotal mounting, and a spring latch having a cam surface engageable by the crossbar tank when moved into closed position to depress the latch and a stop formed in said latch to arrest inward and outward movement of the tank after it has reached the desired position relative to the crossbar to hold the same in closed position.

3. A crossbar tank having spaced walls, means for maintaining said walls at a spaced distance from each other, the upper side of said tank being open and having a configuration conforming to the shape of the crossbar of a cycle, means for pivoting one end of said tank to said crossbar, a spring latch for holding said tank in closed position, a cam piece formed in said latch causing said spring to be opened and closed when the tank is moved into closed position and a stop formed in said tank for limiting the distance said tank can be moved toward said crossbar to have the crossbar act as a cover for the open upper side of the tank.

4. A crossbar tank having a pair of spaced side walls, means for closing the bottom and one end of said tank, a pivotal mounting for attaching said tank at one end to the crossbar of a cycle, the upper open portion of said tank having a configuration which conforms to the shape of the crossbar and means for spacing the upper open side walls of said tank from each other at a distance corresponding to the diameter of the crossbar, a locking spring for holding said tank in closed position, said spring lock having a cam portion which upon engagement with the tank, permits the tank to push the spring backwardly prior to its being locked in closed position and a stop forming an integral part of said spring for limiting the distance said tank can move the open part thereof towards the crossbar.

5. A structure having the features provided for in claim 3 wherein a stop is provided at the pivoted end of the tank for limiting the distance said tank can swing away from said crossbar.

References Cited in the file of this patent

UNITED STATES PATENTS

| | | |
|---|---|---|
| 516,724 | Hunt | Mar. 20, 1894 |
| 604,988 | Knopping | May 31, 1898 |
| 2,051,823 | Clarke | Aug. 23, 1936 |
| 2,756,914 | Bonderer | July 31, 1956 |

FOREIGN PATENTS

| | | |
|---|---|---|
| 162,693 | Germany | Mar. 25, 1949 |